United States Patent
Berentroth et al.

(10) Patent No.: US 7,231,261 B2
(45) Date of Patent: Jun. 12, 2007

(54) METHOD FOR AUTOMATICALLY OBTAINING AN OPERATIONAL SEQUENCE OF PROCESSES AND A TOOL FOR PERFORMING SUCH METHOD

(75) Inventors: Lutz Berentroth, Burgweinting (DE); Stefan Hoelzl, Regensburg (DE); Helmut Wellnhofer, Bad Abbach (DE)

(73) Assignee: Siemens Aktiengesellschaft, Munich (DE)

( * ) Notice: Subject to any disclaimer, the term of this patent is extended or adjusted under 35 U.S.C. 154(b) by 891 days.

(21) Appl. No.: 10/345,627

(22) Filed: Jan. 16, 2003

(65) Prior Publication Data

US 2004/0205756 A1 Oct. 14, 2004

Related U.S. Application Data

(63) Continuation of application No. PCT/DE01/02612, filed on Jul. 12, 2001.

(30) Foreign Application Priority Data

Jul. 18, 2000 (DE) ............................... 100 34 869

(51) Int. Cl.
*G05B 19/18* (2006.01)
*G05B 11/01* (2006.01)
*G05B 13/02* (2006.01)
*G06F 15/00* (2006.01)
*G06F 9/46* (2006.01)

(52) U.S. Cl. .................. 700/7; 700/2; 700/11; 700/23; 700/52; 712/8; 712/220; 712/245; 718/1; 718/100; 340/825

(58) Field of Classification Search ............ 700/2, 700/4, 5, 7, 11, 23, 52, 53; 340/825; 718/1, 718/100; 712/8, 220, 245
See application file for complete search history.

(56) References Cited

U.S. PATENT DOCUMENTS

| 4,794,518 | A | * | 12/1988 | Mizushima | 712/216 |
| 4,975,947 | A | * | 12/1990 | Chauvel | 379/334 |
| 4,977,529 | A | * | 12/1990 | Gregg et al. | 703/18 |
| 5,077,677 | A | * | 12/1991 | Murphy et al. | 706/62 |
| 5,182,794 | A | * | 1/1993 | Gasperi et al. | 706/25 |

(Continued)

FOREIGN PATENT DOCUMENTS

WO    WO 02/06950 A2 *    1/2002

OTHER PUBLICATIONS

"Kurzere Entwicklungszeiten mit automischer Codegenerierung" in Automotive Engineering Partners; Vieweg GmbH, Verlag Friedrich & Sohn Verlagsgeslischaft mbH in den GWV Fachverlagen GmbH, May 1999.

*Primary Examiner*—Ramesh Patel
(74) *Attorney, Agent, or Firm*—Baker Botts L.L.P.

(57) ABSTRACT

In order to automatically calculate an operational sequence of processes that determine an output value from at least one input value, a multitude of processes (P1–P8), whose inputs are provided with at least one of the attributes: input value of the same calculation cycle (PRE), input value of the preceding calculation cycle (POST), input value from any calculation cycle (ANY), are arranged in such a manner that a process, which does not have any input with the attribute input value of the same calculation cycle (PRE), is determined as the first process of a calculation cycle and, in successive analogous steps, determines a quantity of possible sequences.

8 Claims, 7 Drawing Sheets

U.S. PATENT DOCUMENTS

| | | | |
|---|---|---|---|
| 5,808,449 A * | 9/1998 | Hirayama et al. | 322/20 |
| 6,453,316 B1 * | 9/2002 | Karibe et al. | 707/8 |
| 6,714,986 B2 * | 3/2004 | Karibe et al. | 709/240 |
| 6,880,150 B1 * | 4/2005 | Takayama et al. | 717/127 |
| 7,036,106 B1 * | 4/2006 | Wang et al. | 716/18 |
| 2001/0037185 A1 * | 11/2001 | Strietzel et al. | 702/152 |
| 2005/0031197 A1 * | 2/2005 | Knopp | 382/154 |
| 2005/0120319 A1 * | 6/2005 | van Ginneken | 716/6 |

* cited by examiner

FIG 7
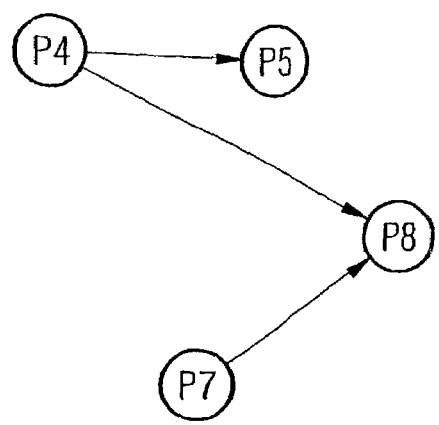
FIG 8
FIG 9
| G1 | G2 | G3 | G4 | G5 |
|----|----|----|----|----|
| P1 | P3 | P6 | P4 | P5 |
| P2 |    |    | P7 | P8 |

METHOD FOR AUTOMATICALLY OBTAINING AN OPERATIONAL SEQUENCE OF PROCESSES AND A TOOL FOR PERFORMING SUCH METHOD

CROSS REFERENCE TO RELATED APPLICATION

This application is a continuation of copending International Application No. PCT/DE01/02612 filed Jul. 12, 2001, which designates the United States, and claims priority to German application number 100 34 869.6 filed Jul. 18, 2000, the contents of which are hereby incorporated by reference in its entirety.

BACKGROUND OF THE INVENTION

The invention relates to a method for automatically obtaining an operational sequence of processes, a method for checking a sequence of processes to be worked through to ascertain inconsistencies in the data flow and a tool for arranging or testing a sequence of processes to be worked through, in particular a sequence of calculation functions of operating system software, for example operating system software of an electronic controller for a motor vehicle.

The publication "Kürzere Entwicklungszeiten mit automatischer Codegenerierung" [shorter development times with automatic code generation ] in Automotive Engineering Partners 5/99, Vieweg GmbH, Verlag Friedrich & Sohn Verlagsgesellschaft mbH of the GWV Fachverlagen GmbH, discloses a tool for automatic code generation for operating system software of motor vehicle controllers and also a testing tool for checking the functions of a controller. The tool for automatic code generation automatically translates the technical presettings of development engineers, which are in the form of a physical description of an automatic control system, into the code that can be read by a controller of a motor vehicle. The testing tool addresses the controller via an interface and generates physically correct signals which would be generated in the actual operation of a motor vehicle. Therefore, the system behavior of the controller, and more precisely its operating system software, can be investigated at an early stage in the laboratory in a simulation of the closed control loop.

However, the tool is not able to determine independently the sequence of processes of an automatic control system, but mainly serves only for translating manual presettings into software code. Furthermore, it is often desirable to take over already tested sequences of processes or individual processes from existing libraries for a new development and to insert new processes at a suitable point of the existing sequence or to link up in an executable sequence known, tested processes with processes to be newly devised.

SUMMARY OF THE INVENTION

It is an aim of the invention to provide a method for automatically calculating an operational sequence of processes, a method for checking a sequence of processes to be worked through and a tool which is able to order a multitude of processes in such a way that all the processes can be purposefully worked through in a way which satisfies the desired data flow.

This aim can be achieved by a method for automatically obtaining an operational sequence of processes that determine an output value from at least one input value, with the following steps:

a multitude of processes whose inputs are provided with at least one of the attributes
"input value of the same calculation cycle",
"input value of the preceding calculation cycle",
"input value from any calculation cycle"
are arranged in such a way that a process which has no input with the attribute "input value of the same calculation cycle" is determined as the first process of a calculation cycle,
the found sequence of the processes is output.

The individual processes can be set in relation to one another in such a way that, to a process whose input is provided with the attribute "input value of the same calculation cycle", a reference can be set from the process which supplies the input value, and from a process whose input is provided with the attribute "input value of the preceding calculation cycle", a reference can be set to the process which supplies the input value. For the calculation of the sequence of the processes, in a first step those processes to which no reference is set can be removed and assigned to a first group of processes. The processes remaining can be respectively investigated in further steps to ascertain processes to which no reference is set, and wherein the processes found in each step are respectively removed from the set of processes to be investigated and assigned to successive groups of processes. From a set of solutions with calculated valid sequences, that sequence with which the calculation of an output value and its use as an input value respectively follow one another most closely in time can be selected. A process which has no input with the attribute "input value of the preceding calculation cycle" can be selected as the last process of a calculation cycle.

Another method is a method for checking a sequence of processes to be worked through to ascertain loops in the data flow, with the following steps:

a multitude of processes whose inputs are provided with at least one of the attributes
"input value of the same calculation cycle",
"input value of the preceding calculation cycle",
"input value from any calculation cycle"
are arranged in such a way that in a first step a process which has no input with the attribute "input value of the same calculation cycle" is determined as the first process,
the first process is assigned to a first group of processes and removed from the set of processes to be investigated,
the processes remaining are respectively investigated in further steps to ascertain processes to which no reference is set,
the processes found in each step are respectively removed from the set of processes to be investigated and assigned to successive groups, until no process which has no input with the attribute "input value of the same calculation cycle" can be identified in a step,
the processes remaining are identified and output.

An embodiment according to the present invention can be a tool for arranging or testing a sequence of processes to be worked through, which comprises:
input means for the input of a multitude of processes whose inputs are respectively provided with at least one of the attributes
"input value of the same calculation cycle",
"input value of the preceding calculation cycle",
"input value from any calculation cycle", at least one microprocessor for calculating an executable sequence of processes by a method according to one of the preceding method claims, an output means for outputting the sequence found.

By the assignment of one of the attributes "input value of the same calculation cycle", "input value of the preceding calculation cycle" or "input value of any calculation cycle" to each data input of the processes to be ordered, it is possible to create by machine an operational, valid sequence which has no inconsistencies in the data flow. An inconsistency means that the attributes assigned to the inputs of the processes cannot be logically fulfilled, since they are mutually exclusive. For example, the inputs of two processes which mutually depend on each other cannot be respectively provided with the attribute "PRE", since otherwise the contradictory condition that each of the two processes has to be calculated before the other process would have to be fulfilled. However, generally there are a multitude of "executable" sequences.

It is possible to determine from the set of executable sequences of processes the one which has the lowest run time or the one which makes the processes whose output values are used as input values in the successive processes follow one another most closely (optimization).

Furthermore, processes which have no dependencies on one another can be identified within a calculation cycle. Such processes that are independent of one another can be worked through in parallel in arithmetic and logic units with multitasking operating systems, in particular in multiprocessor systems.

An inconsistency in a sequence of processes can be determined, for example, in the following way:

1st step: determination of a process which has no input with the attribute "input value of the same calculation cycle" (in relation to the current set of processes).

2nd step: removal of this process from the set of processes.

3rd step: repetition of steps 1 and 2 with respect to the remaining set of processes.

If the set of processes cannot be reduced by the above operation until no process remains, an inconsistency has been found.

It is therefore possible to confirm the sequence of processes as executable without having to test them in an actual system with a complex simulation of the entire system behavior.

The present invention can be used for example for designing operating system software for computers, complex application programs, sequence control systems for industrial production and, in particular, for determining control actions for controllers in automotive engineering, for example engine and transmission controllers.

BRIEF DESCRIPTION OF THE DRAWINGS

Further features, advantages and application possibilities of the invention emerge from the following description of exemplary embodiments in conjunction with the drawings, in which:

FIGS. 5–8 show the resolution of the graph from FIG. 4

FIG. 9 shows the assignment of the processes of FIG. 3 to process groups sequentially following one another and FIGS. 10–13 show the checking of a sequence of processes which have an inconsistency.

DETAILED DESCRIPTION OF THE PREFERRED EMBODIMENTS

Figure 1:
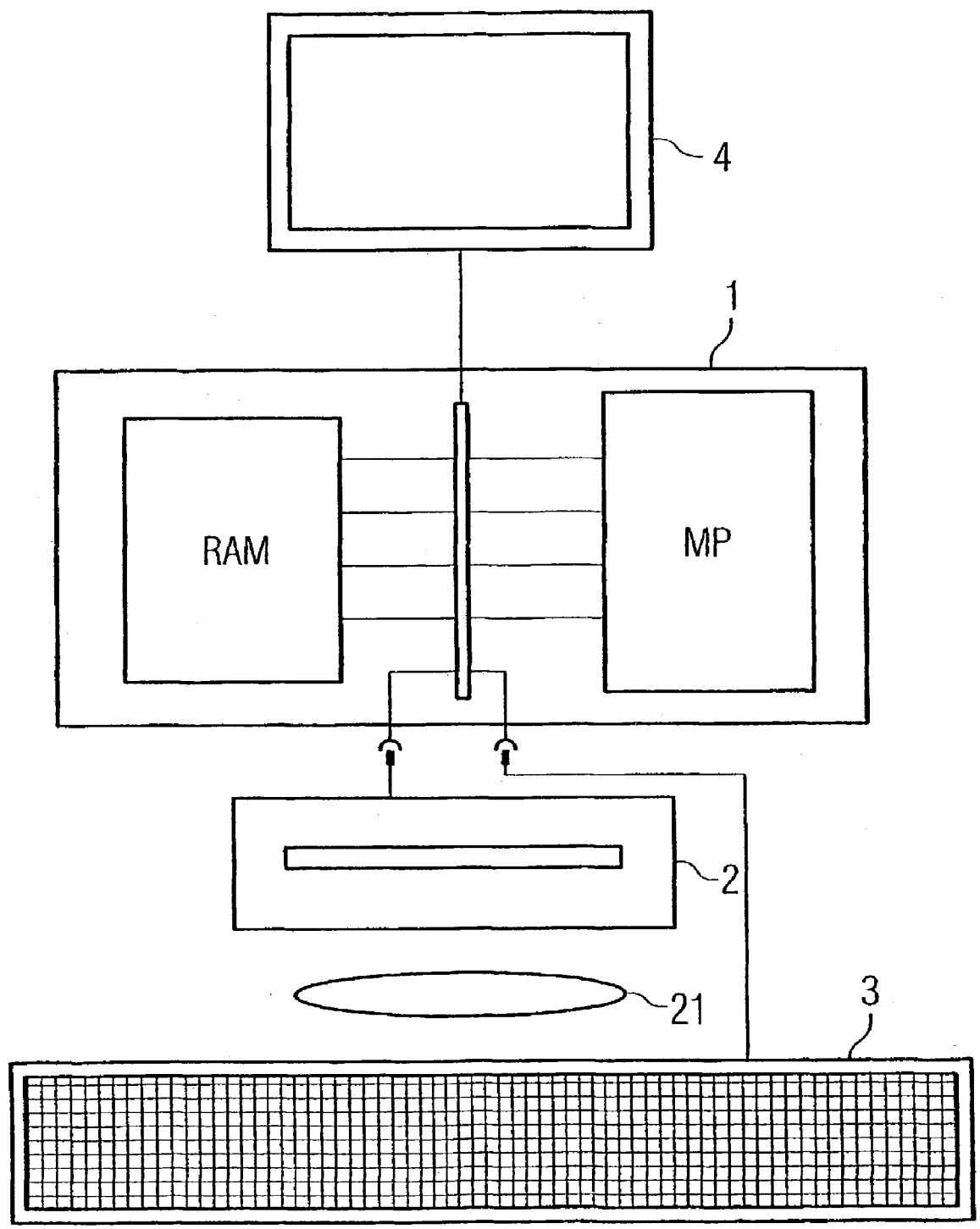
FIG. 1 shows a tool for arranging or testing.

FIG. 1 shows a tool for arranging and/or testing a sequence of processes to be worked through. Said tool has an arithmetic and logic unit 1 with a microprocessor MP and a main memory RAM. Provided with the arithmetic and logic unit 1 as input means are a drive 2 for a storage medium 21, which takes the form of a writable CD (compact disc), and a keyboard 3.

Stored on the storage medium 21 are sequences of processes for the execution of tasks of operating system software or application software and individual processes. This is consequently a library with already existing processes which can be used for creating new programs.

With the keyboard 3, processes can likewise be entered into the arithmetic and logic unit 1.

Serving to present calculation results of the arithmetic and logic unit 1 is an output means, which takes the form of a display device 4.

Figure 2:
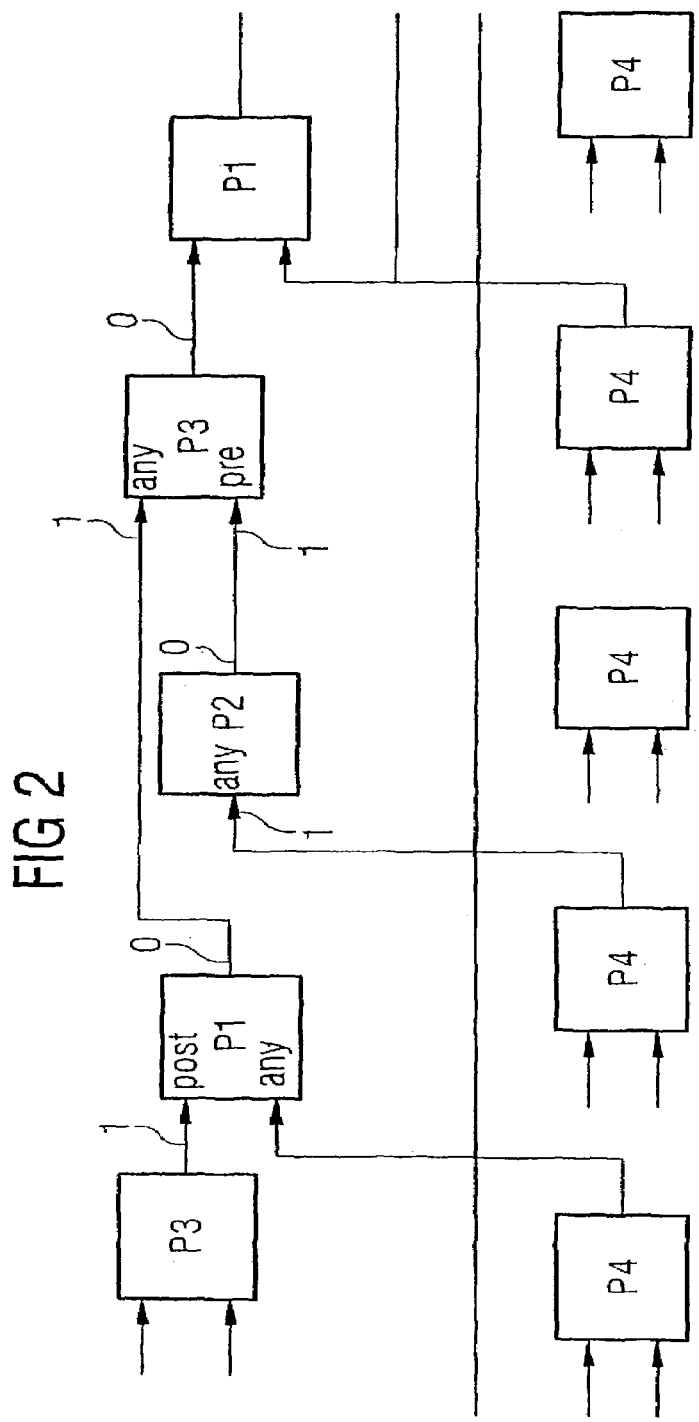
FIG. 2 shows the interlinking of processes within a task.

FIG. 2 illustrates the processes P1–P3 of a calculating cycle n which are linked to one another and work through a task of an operating system of an arithmetic and logic unit or of an application program. The processes P1–P3 are processes which are worked through with regular recurrence. The process P4 is an asynchronous process, which is called up when specific events occur, supplies data for processes within the calculating cycle but does not belong to the calculating cycle being considered.

A task is an ordered sequence of processes which is called up by the operating system or a program. The call may take place cyclically at regular intervals or asynchronously on the basis of specific events. A process is a group of instructions which perform a specific task as a unit. Processes consume input data and generate output data. A process is a unit of instructions which can be interrupted by interrupts, but apart from this is worked through as a unit. On account of the dependence of the data generated on the data consumed, the sequence of processes is decisive for the calculation result.

The sequence of processes P1–P3 is implicitly defined by the use of additional attributes for the type of an input or input port I. The attribute or attributes of an input I defines or define the relative sequence of a process in relation to the other processes of the same calculation cycle n. There are three different types of input ports:

input value of the same calculation cycle: PRE,
input value of the preceding calculation cycle: POST,
input value from any calculation cycle: ANY.

The types of inputs or input ports are often referred to below by the designations PRE, POST and ANY.

An input I of the type PRE requires an input value which is already made available within the same calculation cycle, that is to say has been previously generated. The process whose output or input port 0 supplies the value for the input I provided with the attribute PRE must consequently have been calculated previously in the sequence.

Process P3 has an input I of the type PRE. This input I consumes a value which is made available by the output 0 of the process P2. The tool for arranging or testing a sequence of processes therefore detects that process P2 must be arranged in the sequence before process P3.

In the case of an input I of the type POST, the value provided must not be generated until later in the sequence, so that, when working through the calculation cycle n, the old input value, calculated in the preceding calculation cycle n−1, is made available (this corresponds to a z−1 element in automatic control engineering). The tool for arranging or testing will therefore arrange process P3, the output value of which is required by an input I of the type POST of the process P1, after process P1 in the same calculation cycle n.

In the case of an input of the type ANY, it is immaterial whether the value consumed was calculated in the same calculation cycle n or in the preceding calculation cycle n−1. The occupation of input I with the attribute ANY is therefore merely optional. Frequently, an input of the type ANY obtains its input value from outside the task. In FIG. 2, the process P4 is such an external process. Input ports which obtain their data from external processes always have the attribute ANY.

On account of the allocated attributes for the inputs I of the processes P1–P3, inequalities can be set up. In this way, a relationship is respectively established between a process whose output port 0 provides a value and a process whose input port I consumes this provided value.

If a process supplies an input value for an input I of the type PRE, this process is set to be less than the process with this input of the type PRE. The process which is set as "less" in a relation must be executed before the other process of the relation. If, on the other hand, the input I is of the type POST, the process which supplies the input value is set greater than the process with this input of the type POST. If the input is of the type ANY, the process supplying the input value can be set greater or less than the process receiving the input value. The input of the type ANY can finally be served by a process arranged in the same or following calculation cycle. The arrangement of the two processes in relation to each other is consequently arbitrary. This results in as many inequalities as there are inputs with the attribute PRE or POST in the calculation cycle.

For this example, the following inequalities are therefore obtained:

P3>P1 or P1<P3, and
P1<P3

Only a process which has no input of the type PRE comes into consideration as the first process of a calculation sequence. Only a process which has no input of the type POST comes into consideration as the last process of a sequence.

After that, the processes P1 and P2 come into consideration as first processes of the sequence. Process P3 must not be calculated until after the processes P1 and P2. The processes P1 and P2 can be worked through in any sequence or in parallel.

Figure 3:
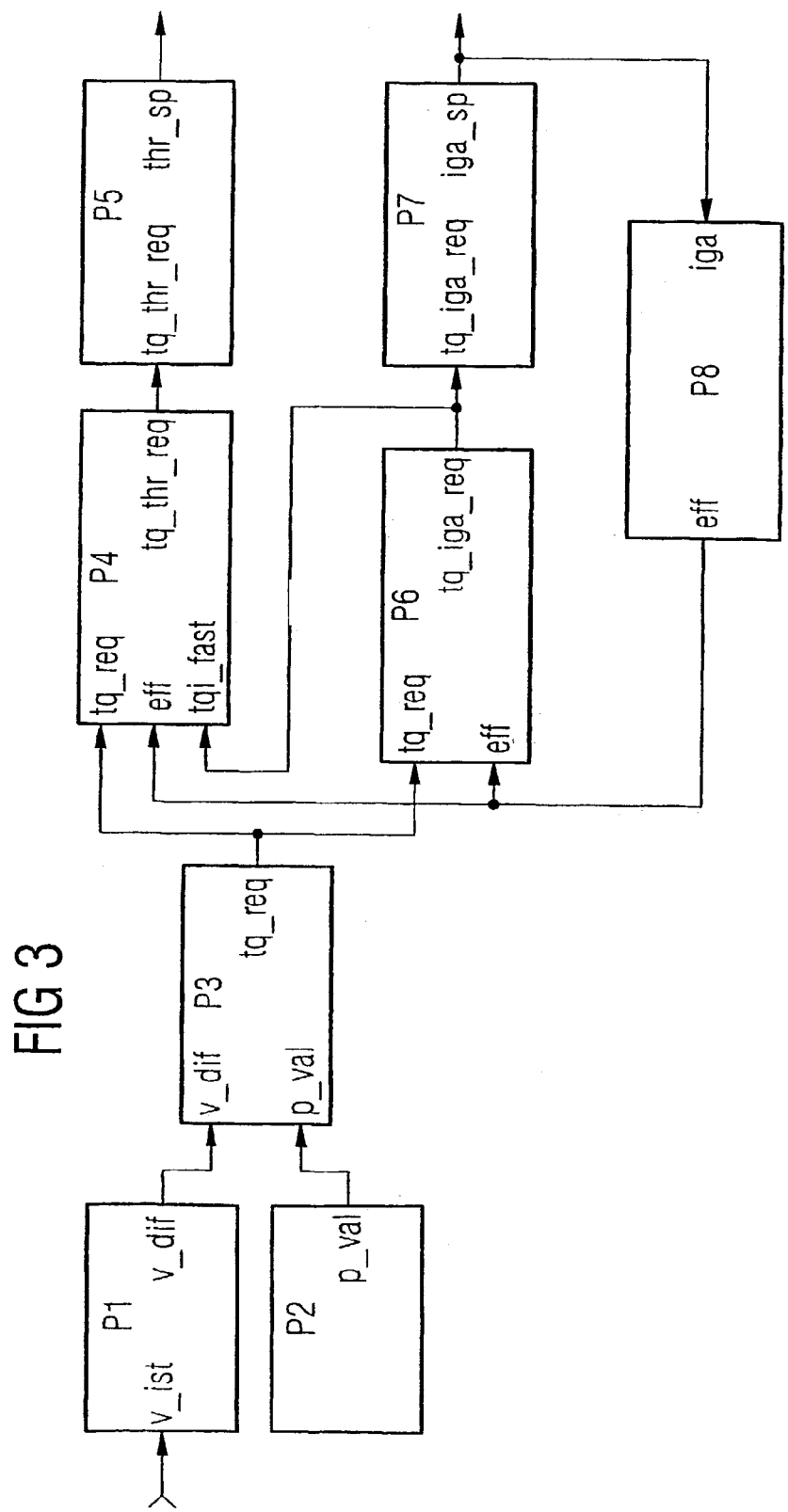
FIG. 3 shows the processes of a torque control of an engine control system

FIG. 3 shows for purposes of illustration a simplified task with a calculation sequence of processes P1–P8 of a torque control of an operating system of an engine controller of a motor vehicle. Such a task typically has, however, a sequence of 100 to 200 processes.

The processes are partly taken from a library. Some processes have been newly designed for the torque control. The graphic of FIG. 3 is available to a developer who wishes to find a valid sequence of processes, but does not yet determine a process sequence.

Process P1 calculates for a user setting of a speed control system (Tempomat [cruise control]) the difference between the actual speed and the speed set by a driver and outputs this difference to process P3. Process P2 calculates a power requirement indicated by a gas pedal position and likewise outputs this to process P3. Process P3 coordinates any existing requirements of the processes P1 and P2 and calculates for this a torque requirement for the processes P4 and P6.

Process P4 determines a slow change in torque and outputs a corresponding requirement to process P5. Process P5 calculates a setpoint value for a throttle valve position and outputs this to a final control element.

Process P6 calculates a rapid change in torque and outputs a corresponding requirement to process P7, which determines a setpoint value for an ignition point and outputs it to the ignition.

Process P8 contains a reference system for the effectiveness of the change in torque through a shift of the ignition point. The processes P4 and P6 decide on the basis of their coupling and the effectiveness how the build-up of a specific torque must be distributed between the two possible manipulated variables, throttle valve and ignition angle.

The task is completely calculated cyclically, for example every 10 ms. All input values of the processes P3 to P8, with the exception of the input values or inputs identified by "eff", must have been calculated previously in the same calculation cycle. They consequently must obtain the attribute "input value of the same calculation cycle" PRE. The input values denoted by "eff" must have been calculated in the preceding calculation cycle, that is to say when the task was previously executed. Accordingly, these input values or the corresponding inputs obtain the attribute "input value of the preceding calculation cycle" POST.

For each input of the processes P1–P8 it can consequently be specified whether a value currently calculated in the same calculation cycle or a value determined in the preceding calculation cycle when the task was previously worked through must be used. The latter corresponds to a z−1 element from automatic control engineering. The input values of the processes P1 and P2 are not defined. They may consequently obtain the attribute "input value from any calculation cycle" ANY.

On the basis of these premises, the following relations are obtained for the processes P1–P8:

P1<P3
P2<P3
P3<P4
P3<P6
P4<P5
P6<P4
P4<P8
P6<P7
P6<P8
P7<P8

Only processes which do not require any input value calculated in the same calculation cycle come into consideration as first processes of the sequence. The first process consequently must not have any input occupied with the attribute PRE. The last process of the sequence must not have any input occupied by the attribute POST. All the calculation sequences which satisfy these conditions and the inequalities set up are valid or executable sequences.

The system of inequalities can be resolved in a computer-aided manner, for example by application of the graph theory. A graph is set up by using the processes as nodes and each inequality as a directed edge of the graph. A directed edge is a reference from one process to another process. The directed edge is respectively directed from the process or node which was determined as less in the corresponding inequality to the process or node which was determined as greater in the same inequality.

Expressed in different terms, to a process whose input is provided with the attribute PRE, a reference is respectively set from the process which supplies the input value. From a process whose input value is provided with the attribute POST, a reference is set to the process which supplies the input value.

Figure 4:
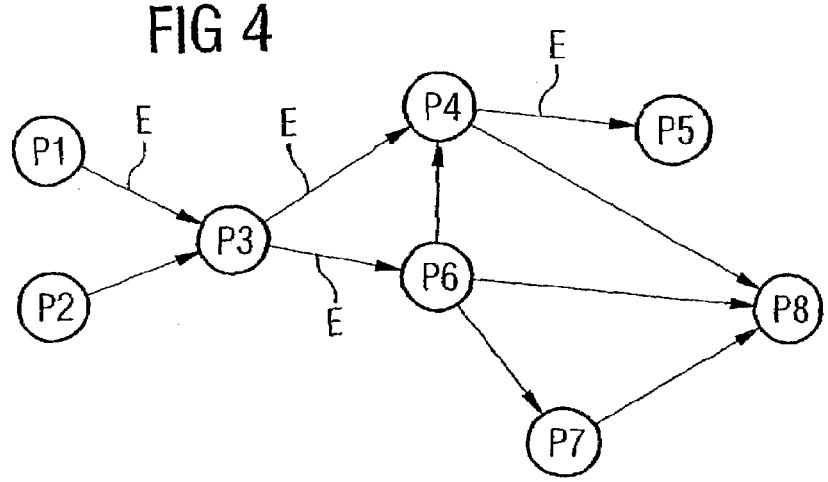
FIG. 4 shows the representation of the interlinking of the processes from FIG. 3 in the form of a graph.

The conversion of the inequalities presented above into a graph is represented in FIG. 4. In a first processing step or a first iteration, all the nodes (processes) are removed from the set of nodes (processes) to be checked, including the associated references E (edges) to which no references E (edges) of the graph point. This applies to the processes P1 and P2 which have no input with the attribute PRE. These processes are assigned to a first group of processes of the calculation cycle.

The processes within a group of processes can be worked through in any sequence or in parallel.

Working through the algorithm recursively has the effect of respectively forming a new group of processes, which must be worked through in execution of the program after the preceding group of processes. Consequently, the processes remaining after each step are respectively investigated in further successive steps to ascertain processes to which no reference E is set. The processes found in each step are removed and assigned to successive groups of processes. These groups may comprise one or more processes. The sequence of the processes within a group is arbitrary, since these processes are independent from one another. However, all the processes of a group must be worked through before a process of the next group is executed.

Figure 5:
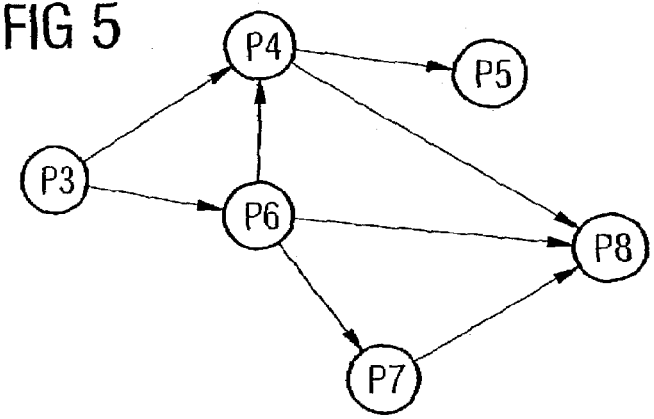

In FIG. 5, the graph reduced by the processes P1 and P2 is shown. Even in this subgraph, at least one node (process) to which no edge points must exist. All the nodes to which no edge points must in turn be removed. If no node (process) which fulfils this condition exists, an unresolvable loop, and consequently an inconsistency in the data flow, has been discovered.

In a second step, the process P3 is consequently removed and assigned to a second group of processes.

Figure 6:
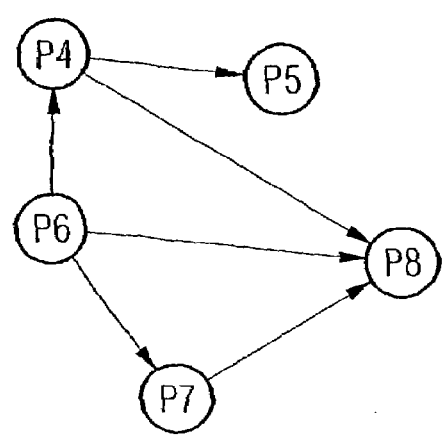

The result is represented in FIG. 6.

In a third step, process 6, to which no edge points, is then removed.

The resultant remaining graph is represented in FIG. 7. Process 6 is assigned to a third group of processes.

In a fourth step, the processes P4 and P7 are removed and assigned to a fourth group of processes.

Consequently, all that remains are the processes P5 and P8, which are represented in FIG. 8. No edge points to these remaining processes, so that both processes are assigned to a fifth and final group of processes.

In the sequence of the steps or the groups of processes, the sequence in which the processes have to be worked through has been found. The processes isolated in one step must be executed before the processes which have been isolated in the next step.

The assignment of the individual processes P1–P8 to groups of processes G1–G5 is illustrated in FIG. 9.

Since there may be more than one process present in each case in the groups, a multitude of different, executable sequences can be formed. From this multitude of valid sequences, the one which takes up the shortest run time or the one with which the calculation of an output value and its use as an input value respectively follow one another most closely in time (optimization) may be determined for example.

Figure 10:
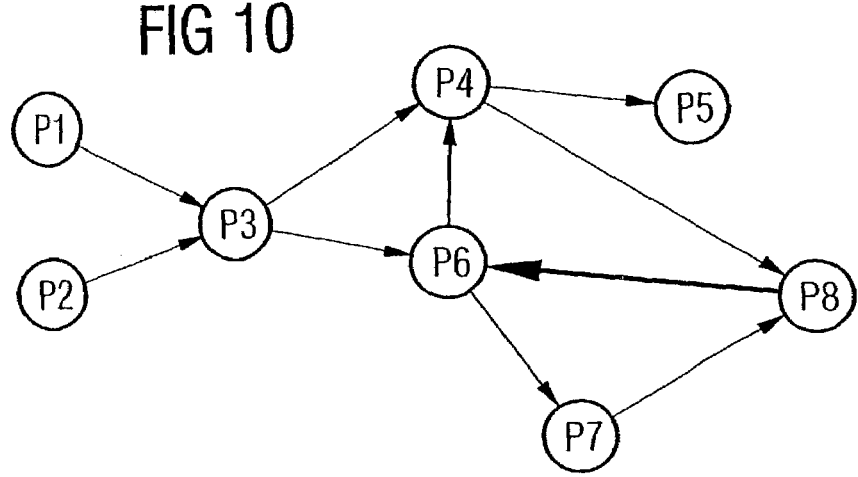

FIG. 10 shows a graph which contains an unresolvable loop. The graph does not represent the torque control from FIG. 3.

Figure 11:
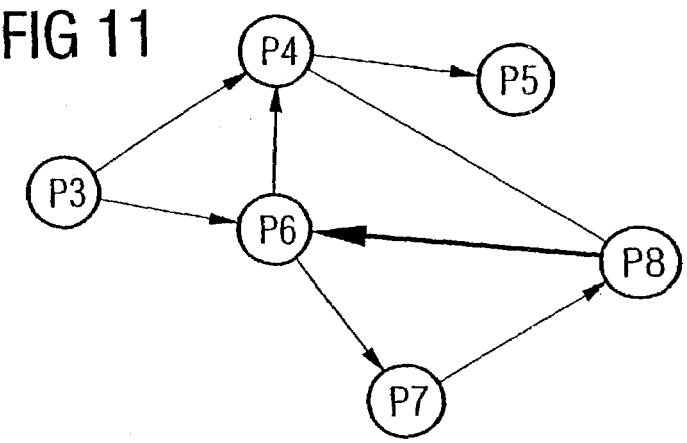
Figure 12:
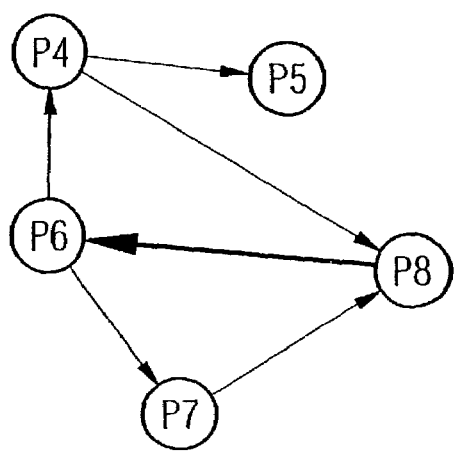

According to the calculation steps presented above, it was attempted to divide up the graph into individual groups of processes with the tool for arranging or testing. The result of the processing steps 1 to 3 is represented in FIGS. 11 to 13.

Figure 13:
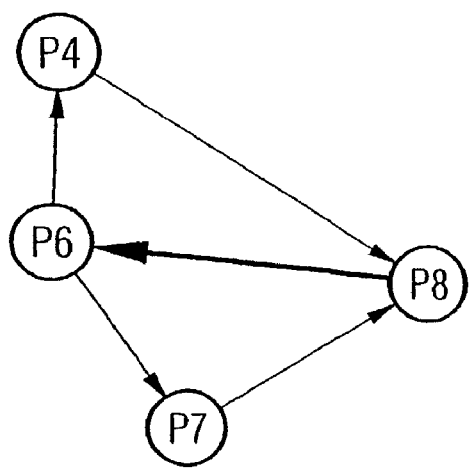

In FIG. 13, which represents the result of the third step, finally, it was not possible to find a process or node to which no edge of the graph points. Consequently, there is no process which has no input with the attribute PRE. The remaining processes consequently cannot be assigned to any group. There is a loop which must be resolved in order to obtain an executable task. The remaining processes are output onto a display device or a printer.

The invention claimed is:

1. A method for automatically obtaining an operational sequence of processes that determine an output value from at least one input value, comprising:
   providing a set of processes each having an input value with at least one of the following attributes relating to a current calculation cycle of the sequence:
      a first attribute indicating that the input value associated with one of the processes must be generated in a prior calculation cycle of the operational sequence,
      a second attribute indicating that the input value associated with one of the processes must be generated in a subsequent calculation cycle of the operational sequence,
      a third attribute indicating that the input value associated with one of the processes may be generated during any calculation cycle of the operational sequence; arranging the processes in such a way that any process which does not have the first attribute is determined to be the first process of the current calculation cycle, and
   outputting the arranged sequence of processes.

2. The method as claimed in claim 1, further comprising:
   with respect to any process with the first attribute, setting a reference from an earlier process which supplies the associated input value for such process; and
   with respect to any process with the second attribute, setting a reference to a later process which supplies the associated input value for such process.

3. The method as claimed in claim 2, wherein arranging in the processes further comprises:
   removing from the set all processes to which no reference is set from any other process in the set; and
   assigning such removed processes to a first group of processes.

4. The method as claimed in claim 3, wherein arranging the processes further comprises:
   removing from the remaining set all processes to which no reference is set from any other process remaining in the set;
   assigning such removed processes to one of a plurality of successive groups of processes;
   repeating the removing and assigning of processes until no processes remain in the set.

5. The method as claimed in claim 1, wherein:
   the outputted sequence comprises one or more first processes each with an output value that is used as an input value to a second process in the outputted sequence; and
   each first process and its associated second process are placed in the sequence as close in time to each other as possible.

6. The method as claimed in claim 1, wherein a process which has no input with the second attribute is determined to be the last process of a calculation cycle.

7. A method for automatically obtaining an operational sequence of processes that determine an output value from at least one input value, comprising:

providing a set of processes each having an input value with at least one of the following attributes relating to a current calculation cycle of the sequence:

a first attribute indicating that the input value associated with one of the processes must be generated in a prior calculation cycle of the operational sequence, a second attribute indicating that the input value associated with one of the processes must be generated in a subsequent calculation cycle of the operational sequence, a third attribute indicating that the input value associated with one of the processes may be generated during any calculation cycle of the operational sequence;

with respect to any process with the first attribute, setting a reference from an earlier process which supplies the associated input value for such process;

with respect to any process with the second attribute, setting a reference to a later process which supplies the associated input value for such process arranging the processes in such a way that:

any process which does not have the first attribute is determined to be the first process in the sequence and, is assigned to a first group of processes and removed from the set of processes, the processes remaining in the set are each investigated to ascertain any processes to which no reference is set, the processes to which no reference is set are removed from the set of processes and assigned to one of a plurality of successive groups, and the steps of ascertaining processes to which no reference is set and removing such processes from the set are repeated until no process remains in the set which does not have the first attribute.

8. A system for automatically obtaining an operational sequence of processes that determine an output value from at least one input value, comprising:

a means for providing a set of processes each having an input value with at least one of the following attributes relating to a current calculation cycle of the sequence:

a first attribute indicating that the input value associated with one of the processes must be generated in a prior calculation cycle of the operational sequence, a second attribute indicating that the input value associated with one of the processes must be generated in a subsequent calculation cycle of the operational sequence, a third attribute indicating that the input value associated with one of the processes may be generated during any calculation cycle of the operational sequence;

with respect to any process with the first attribute, setting a reference from an earlier process which supplies the associated input value for such process;

with respect to any process with the second attribute, setting a reference to a later process which supplies the associated input value for such process arranging the processes in such a way that:

any process which does not have the first attribute is determined to be the first process in the sequence and, is assigned to a first group of processes and removed from the set of processes, the processes remaining in the set are each investigated to ascertain any processes to which no reference is set, the processes to which no reference is set removed from the set of processes and assigned to one of a plurality of successive groups, and the steps of ascertaining processes to which no reference is set and removing such processes from the set are repeated until no process remains in the set which does not have the first attribute.

* * * * *